(12) United States Patent
Perkinson

(10) Patent No.: US 8,496,436 B2
(45) Date of Patent: Jul. 30, 2013

(54) TORQUE COMPENSATION FOR PROPELLER PITCH CHANGE MECHANISM

(75) Inventor: Robert H. Perkinson, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 871 days.

(21) Appl. No.: 12/685,034

(22) Filed: Jan. 11, 2010

(65) Prior Publication Data

US 2011/0171027 A1    Jul. 14, 2011

(51) Int. Cl.
 *B64C 11/34* (2006.01)
(52) U.S. Cl.
 USPC ......................................................... 416/147
(58) Field of Classification Search
 USPC ................................... 416/147, 151, 160, 162
 See application file for complete search history.

(56) References Cited

U.S. PATENT DOCUMENTS

| 4,523,891 | A | 6/1985 | Schwartz et al. |
| 4,753,573 | A | 6/1988 | Kusiak |
| 5,154,580 | A | 10/1992 | Hora |
| 5,174,716 | A * | 12/1992 | Hora et al. ...................... 416/26 |
| 5,186,608 | A | 2/1993 | Bagge |
| 5,391,055 | A | 2/1995 | Carvalho |
| 5,431,539 | A | 7/1995 | Carvalho |
| 5,451,141 | A | 9/1995 | Carvalho |
| 5,931,637 | A | 8/1999 | Wheeler |
| 6,352,410 | B1 | 3/2002 | Muller |
| 6,811,376 | B2 | 11/2004 | Arel et al. |
| 6,981,844 | B2 | 1/2006 | Perkinson et al. |
| 7,172,391 | B2 | 2/2007 | Carvalho |
| 7,296,969 | B2 | 11/2007 | Raes et al. |

* cited by examiner

*Primary Examiner* — Richard Edgar
(74) *Attorney, Agent, or Firm* — Carlson, Gaskey & Olds, PC

(57) ABSTRACT

A propeller assembly has a plurality of propeller blades, and a pitch change mechanism including at least one motor. A drive input drives the plurality of propeller blades to rotate about a central drive axis. The pitch change mechanism is operable upon driving of the motor to move the propeller blades relative to the drive input. The drive input includes a drive input gear transmission to change a pitch angle of the blades when the blades are moved relative to the drive input by the pitch change mechanism. Further, a method of operating a propeller assembly to change a pitch angle is disclosed and claimed.

11 Claims, 1 Drawing Sheet

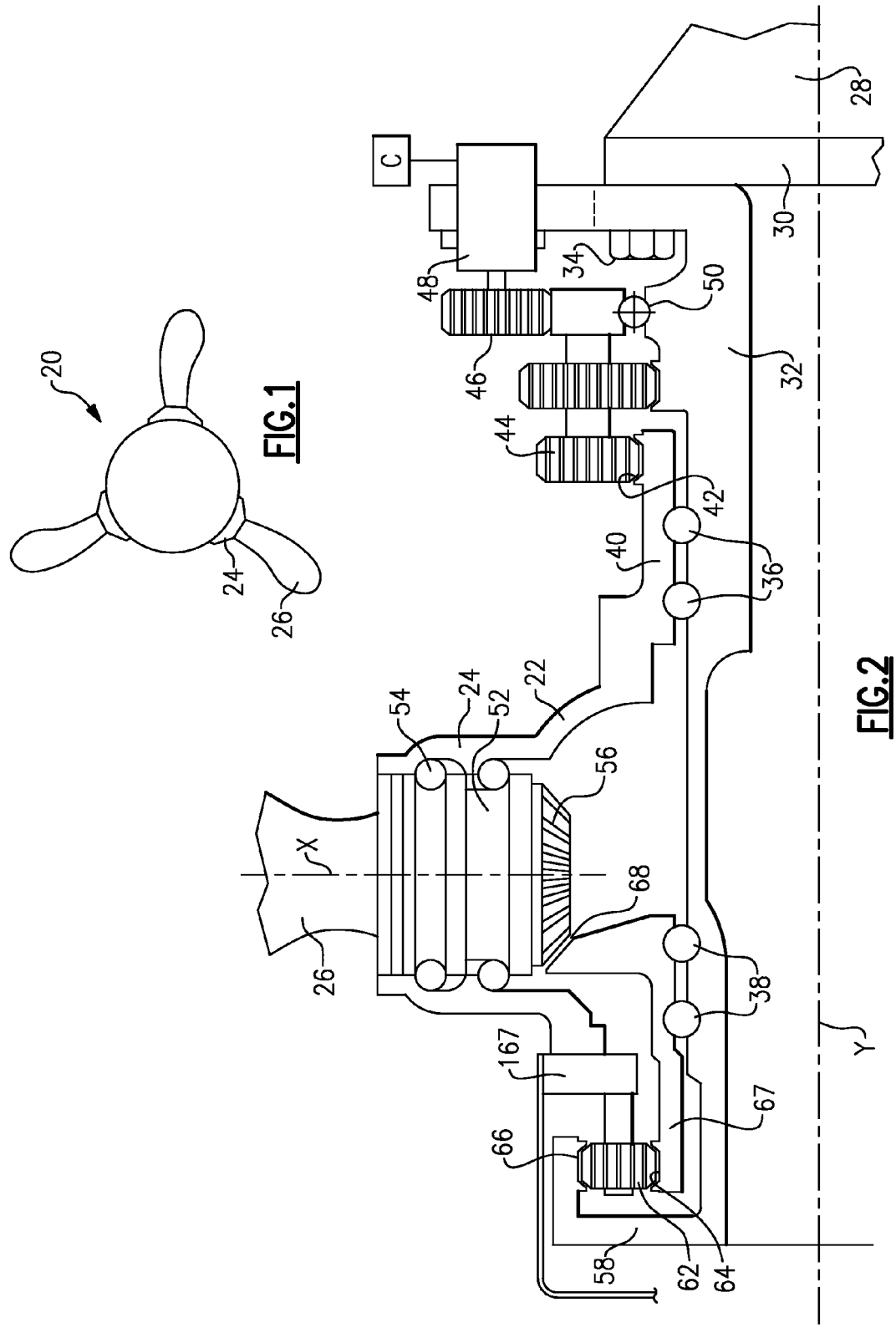

TORQUE COMPENSATION FOR PROPELLER PITCH CHANGE MECHANISM

BACKGROUND OF THE INVENTION

This application relates to a propeller pitch change mechanism wherein torque compensation is provided from a drive input.

Propeller pitch change mechanisms are known, and are utilized in a propeller assembly which carries a plurality of blades. The assembly is driven to rotate, and carries the blades for rotation. However, the pitch angle of the blades can be adjusted to provide an adjustable thrust from the rotation of the assembly.

A pitch change mechanism typically has included a gear train which causes the blade to rotate within a hub that carries the blade. There are challenges in the prior art in that there are forces on the blades which tend to force the blades toward a flat position wherein the provided thrust is minimized.

There is a total twisting moment ("TTM") on each blade which is the algebraic sum of a centrifugal twisting moment, an aerodynamic twisting moment, and friction which always resists the direction of motion.

The prior art systems have been required to overcome all of these forces. This TTM is large, and causes parasitic loss of energy when the pitch change mechanism must drive the blade, and overcome the forces.

SUMMARY OF THE INVENTION

A propeller assembly has a plurality of propeller blades, and a pitch change mechanism including at least one motor. A drive input drives the plurality of propeller blades to rotate about a central drive axis. The pitch change mechanism is operable upon driving of the motor to move the propeller blades relative to the drive input. The drive input includes a drive input gear transmission to change a pitch angle of the blades when the blades are moved relative to the drive input by the pitch change mechanism. Further, a method of operating a propeller assembly to change a pitch angle is disclosed and claimed.

These and other features of the present invention can be best understood from the following specification and drawings, the following of which is a brief description.

BRIEF DESCRIPTION OF THE DRAWINGS

FIG. 1 schematically shows a propeller assembly.

FIG. 2 shows a cross-section through a hub and propeller blade, including a pitch change mechanism.

DETAILED DESCRIPTION OF THE PREFERRED EMBODIMENT

Propeller assembly 20 is illustrated in FIG. 1 carrying a plurality of arm bores 24 each carrying a blade 26. These arm bores are integral with a hub 22, see FIG. 2. As is known, the bore 22 surrounds a drive shaft 32, and carries the blades 26 in separate arm bores 24.

As can be seen in FIG. 2, each of the blades 26 can be rotated about a pitch angle axis X to change the pitch angle of the blade relative to the approaching air. This change is made by a control C, through motor(s) 48, and to provide desired thrust, as known.

As mentioned above, in the prior art, the pitch change mechanism has typically caused each blade to rotate relative to the arm bores 24. The known pitch change mechanisms have also been required to overcome a good deal of force from the total twisting moment, as described above.

As shown in FIG. 2, a prop shaft 28 delivers a rotational torque through a plate 30, to a shaft 32. The shaft 32 is bolted at 34 to the plate 30 and prop shaft 28.

Ball bearings 36 support the hub 22 and a support shaft 40 on the shaft 32 at one end. Other ball bearings 38 support a compensation shaft 67 at an opposed end of the shaft 32.

As shown, the shaft 32 extends to an end 58 beyond a gear 62, and then back outwardly of the gear 62 to a gear tooth portion 66. Portion 66 is driven to rotate with the shaft 32, and drives the gear 62. Gear 62 is mounted for rotation within a plate 167, which is part of the hub 22.

The gear 62 drives gear teeth 64 on the compensation shaft 67. Compensation shaft 67 includes a bevel gear tooth section 68 which engages with a bevel gear 56 at an end 52 of each propeller blade 26.

Ball bearings 54 secure each arm bore 24 and hub 22 to rotate with a blade 26. Generally, a ball bearing necklace is received between grooves and shanks in the arm bores and the blades to secure the blades within the arm bores.

When it is desired to change the pitch angle, the control C controls the motor or motors 48 to drive the gears 46 and 44 to engage and drive gear teeth 42 on the support shaft 40. This causes the hub 22 to pivot or rotate about the axis Y relative to shaft 32.

When the motor 48 drives the gear 46 to rotate the hub 22, the hub and the propeller blades 26 all rotate, causing the hub 22 and hence the propeller blades 26 to rotate relative to the shaft 32. When this occurs, the bevel gear 68 resists the relative movement of the bevel gears 56 from the plurality of propeller blades 26. Instead, the bevel gears 56, and hence the propeller blades 26 are caused to rotate about the axis X and change the pitch angle. Stated another way, the motor 48 and its gear train could be termed an active pitch change mechanism, which in turn causes a passive pitch change mechanism, including gears 66, 62, 64, 68, 56 to actually change the pitch angle for each of the propeller blades 26.

Thus, the compensation side of the drive of the blade 26 can be designed to address the total twisting moment such that the motor 48 must only overcome a much smaller force when seeking to change the pitch angle of the blade 26.

Since the torque from the drive input or prop shaft 28 is utilized to compensate for the bulk of the total twisting moment, the motor 48 and its gear train need overcome the much smaller frictional forces resisting movement of the hub 22. As such, the disclosed invention allows for a much smaller package of actuation structure, and further provides much more efficient operation in that it eliminates a good deal of parasitic loss.

While FIG. 2 shows only one side of the assembly, it should be understood that the bulk of the components are all cylindrical and surround the axis Y.

The motor(s) 48 may be hydraulic or electric.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A propeller assembly comprising:
    a plurality of propeller blades, and a pitch change mechanism including at least one motor;
    a drive input for driving said plurality of propeller blades to rotate about a central drive axis, said pitch change mechanism being operable upon driving of said motor to move said propeller blades relative to said drive input, and said drive input including a drive input gear transmission to resist rotation of said blades to change a pitch angle of said blades when said blades are moved relative to said drive input by said pitch change mechanism.

2. The assembly as set forth in claim 1, wherein said propeller blades are mounted in arm bores in a hub, and said hub is caused to move relative to said drive input by said pitch change mechanism to cause said drive input gear transmission to change said pitch angle.

3. The assembly as set forth in claim 2, wherein said drive input gear transmission includes a gear which engages a bevel gear on ends of said blades to cause said blades to rotate to change said pitch angle when said blades move relative to said drive input.

4. The assembly as set forth in claim 1, wherein said pitch change mechanism is mounted for rotation with said drive input.

5. A propeller assembly comprising:
a hub carrying a plurality of arm bores, with each of said arm bores being associated with a propeller blade;
a drive input for driving said hub to rotate about a central drive axis, and carry said arm bores and said blades for rotation,
an active pitch change mechanism including a motor for driving gears, and causing said hub and said blades to rotate relative to said drive input and about said central drive axis; and
said drive input providing compensation to drive said blades about a pitch angle through a force provided by said drive input due to said relative rotation by resisting rotation of the blades.

6. The assembly as set forth in claim 5, wherein said arm bores are each driven by said active pitch change mechanism, and said blades are each driven to change said pitch angle by a passive pitch change mechanism.

7. A propeller assembly comprising:
a hub carrying a plurality of arm bores, with each of said arm bores being associated with a propeller blade;
a drive input for driving said hub to rotate about a central drive axis, and carry said arm bores and said blades for rotation,
an active pitch change mechanism including a motor for driving gears, and causing said hub and said blades to rotate relative to said drive input;
said drive input providing compensation to drive said blades about a pitch angle through a force provided by said drive input due to said relative rotation;
said arm bores are each driven by said active pitch change mechanism, and said blades are each driven to change said pitch angle by a passive pitch change mechanism; and
said drive input includes an input shaft to be attached to a prop shaft, said input shaft extending beyond said arm bores, and having gear teeth engaged with a compensation gear which in turn drives a compensation shaft, said compensation shaft engaged with gear teeth at an end of said blades to provide said passive pitch change mechanism.

8. The assembly as set forth in claim 7, wherein said active pitch change mechanism includes a gear train driven by the motor, said gear train driving gear teeth on a support shaft associated with said hub to in turn drive said blades to rotate relative to said drive input.

9. The assembly as set forth in claim 8, wherein bearings support each of said compensation shaft and said support shaft on said input shaft.

10. A method of operating a propeller assembly including:
rotating a drive input and driving a plurality of propeller blades to rotate about a central drive axis;
selectively driving said blades relative to said drive input, and said drive input changing a pitch angle of said blades when said blades are moved relative to said drive input; and
said blades are mounted in arm bores in a hub, and moving said hub relative to said drive input by a pitch change mechanism.

11. The method as set forth in claim 10, wherein said drive input drives a gear which engages a bevel gear on ends of said blades and causing said blades to rotate to change said pitch angle when said blades move relative to said drive input, but wherein said blades normally rotate with said gear mechanism.

* * * * *